United States Patent [19]

Hayami

[11] Patent Number: 5,084,822
[45] Date of Patent: Jan. 28, 1992

[54] NAVIGATION APPARATUS FOR MOVING OBJECT

[75] Inventor: Katsuro Hayami, Hyogo, Japan

[73] Assignee: Mitsubishi Denki Kabushiki Kaisha, Tokyo, Japan

[21] Appl. No.: 284,369

[22] Filed: Dec. 14, 1988

[30] Foreign Application Priority Data

Dec. 15, 1987 [JP] Japan .................. 62-315319
Dec. 18, 1987 [JP] Japan .................. 62-318670
Dec. 22, 1987 [JP] Japan .................. 62-322680

[51] Int. Cl.⁵ .............................. G06F 15/50
[52] U.S. Cl. .................... 364/449; 364/443; 340/995; 340/990; 73/178 R
[58] Field of Search ........... 364/449, 444, 443, 521, 364/424.01; 340/990, 995; 342/450, 451, 452, 458, 461; 73/178 R

[56] References Cited

U.S. PATENT DOCUMENTS

| 4,535,335 | 8/1985 | Tagami et al. | 340/995 |
|---|---|---|---|
| 4,608,658 | 8/1986 | Tanaka et al. | 364/424.01 |
| 4,633,709 | 1/1987 | Numata et al. | 73/178 R |
| 4,635,202 | 1/1987 | Tsujii et al. | 364/449 |
| 4,672,563 | 6/1987 | Harumatsu et al. | 364/449 |
| 4,675,676 | 6/1987 | Tanaka et al. | 364/424.01 |
| 4,677,561 | 6/1987 | Akama et al. | 364/449 |
| 4,677,562 | 6/1987 | Uota et al. | 364/449 |
| 4,677,563 | 6/1987 | Itoh et al. | 364/449 |
| 4,689,747 | 8/1987 | Kurose et al. | 340/995 |
| 4,882,696 | 11/1989 | Nimura et al. | 340/988 |
| 4,888,699 | 12/1989 | Knoll et al. | 364/449 |
| 4,939,662 | 7/1990 | Nimura et al. | 340/995 |
| 4,943,925 | 7/1990 | Moroto et al. | 364/444 |

Primary Examiner—Parshotam S. Lall
Assistant Examiner—V. N. Trans
Attorney, Agent, or Firm—Burns, Doane, Swecker & Mathis

[57] ABSTRACT

A navigation apparatus in which the scale of a displayed map is automatically adjusted in dependence on parameter such as the distance between the moving object and a preselected destination.

2 Claims, 13 Drawing Sheets

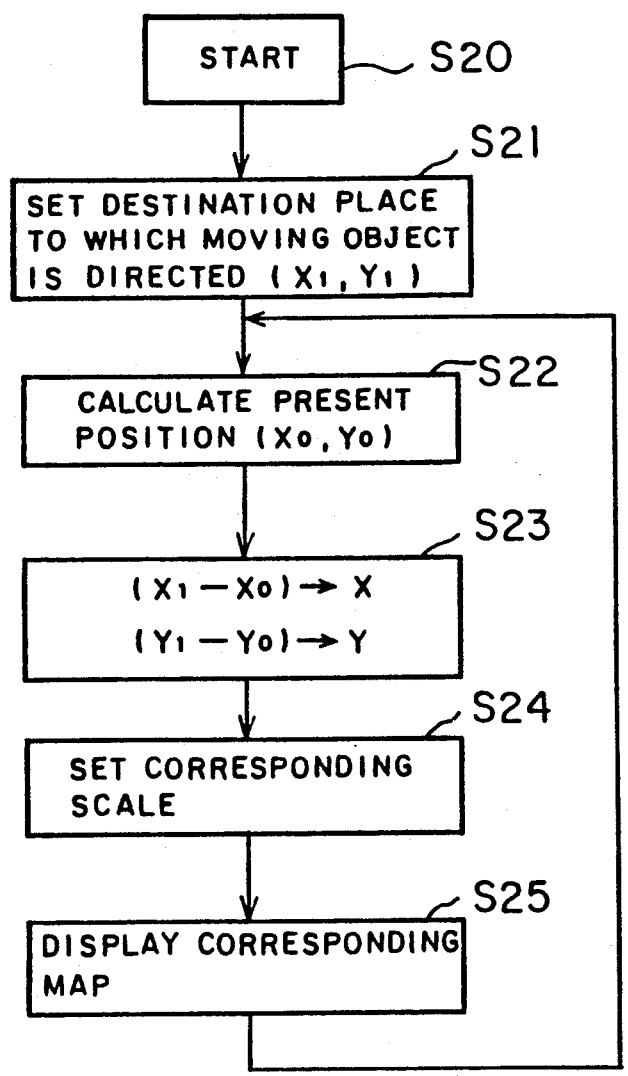

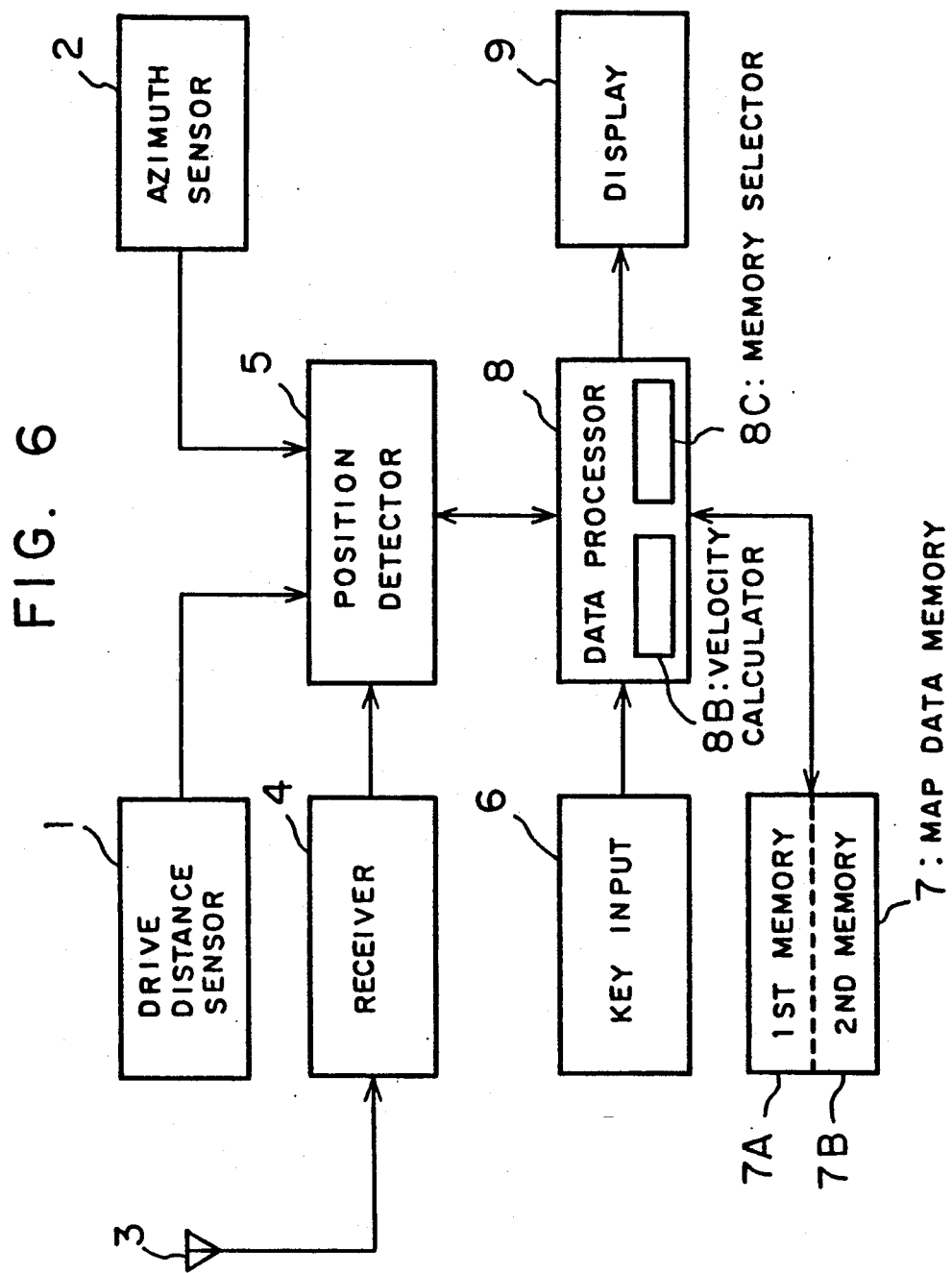

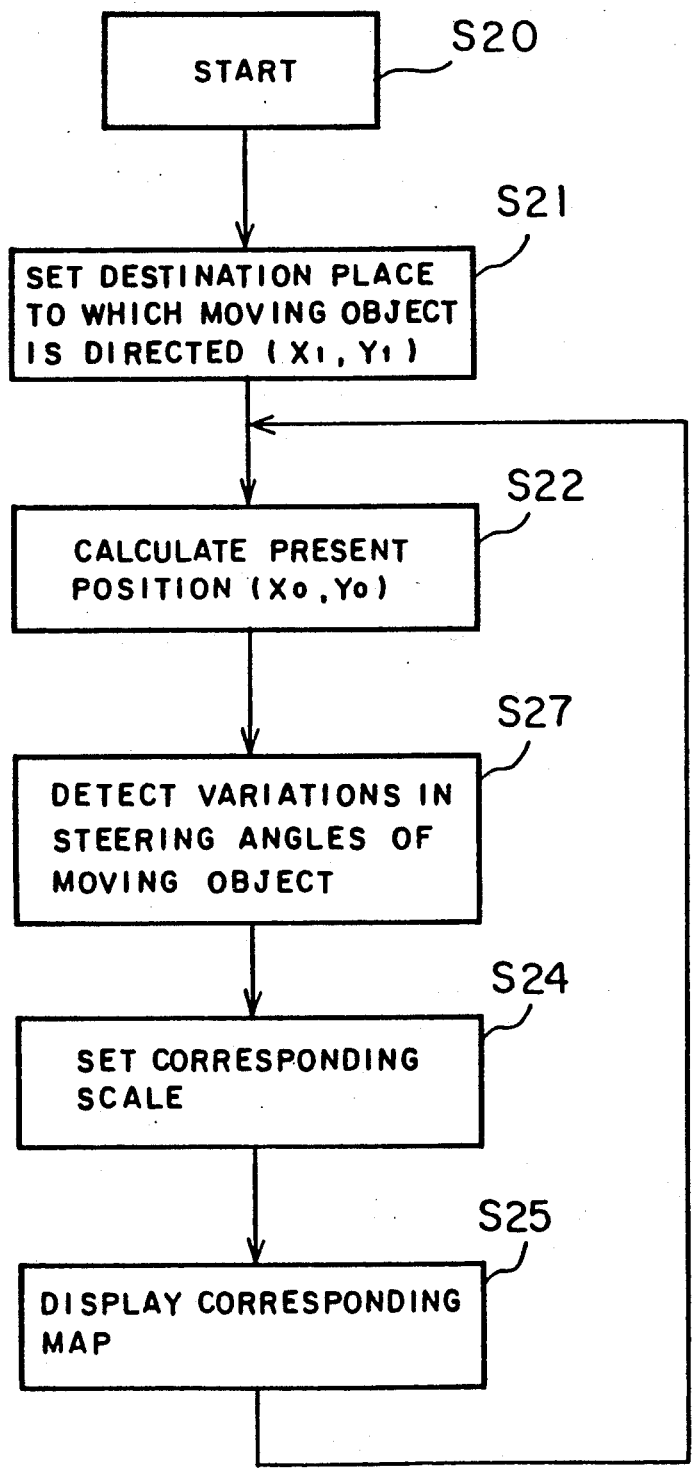

NAVIGATION APPARATUS FOR MOVING OBJECT

BACKGROUND OF THE INVENTION

1. Field of the Invention

The present invention generally relates to a navigation apparatus for a moving object. More specifically, the present invention is directed to a navigation apparatus for a moving object capable of setting an optimum scale of a map displayed on a display unit of the moving object, depending upon moving conditions of the moving object, e.g., moving vehicles or the like. These moving conditions involve, for instance, a distance between a present position of a moving vehicle and a place to which a moving vehicle is directed; a moving velocity of a moving object; and a variation in a steering angle of a moving object and the like.

2. Description of the Prior Art

A great attention is given to a GPS navigation apparatus that is useful to confirm and/or decide a present position and a moving velocity of various types of moving objects such as ships, aircrafts, automobiles by transmitting electromagnetic waves toward these moving objects from a plurality of artificial satellites. It should be understood that the above-described GPS navigation apparatus implies the Global Positioning System where the present position of the moving object can be recognized by receiving the electromagnetic wave transmitted from a plurality of artificial satellites belonging to the GPS navigation system.

As is known in the art, the navigation operation utilizing such a GPS navigation apparatus is normally carried out by receiving the electromagnetic waves transmitted from more than three artificial satellites These electromagnetic waves transmitted from a plurality of artificial satellites are simultaneously received at the side of the moving object, a predetermined correction is performed for a time shift based upon a difference in time precision between a timer device employed in the moving object and timer devices employed in a plurality of artificial satellites, and thereafter the present position of the moving object is displayed by the proper display means In this case, the required map information is displayed on the above-described display means being superimposed on the information of the above-described present position.

As the above-described navigation apparatuses for the various types of the moving objects, a so-called "self-contained" type navigation apparatus is known. Such a sort of the self-contained type navigation apparatus is different from the above-described GPS navigation apparatus, and is characterized in that the present position of the moving object can be confirmed based upon only the data which have been acquired by the moving object itself independent upon the external data such as the navigating electromagnetic waves from the artificial satellites.

FIG. 1 is a schematic block diagram of the above-described conventional navigation apparatus. In FIG. 1, reference numeral 3 denotes an antenna for receiving the electromagnetic waves transmitted from the satellites. An output side of the antenna 3 is connected to a receiver unit 4. Reference numeral 1 indicates a sensor for a drive distance, and reference numeral 2 represents an azimuth sensor, which are connected to the output side of the receiver unit 4, and also to a position detecting unit 5. An output side of the position detecting unit 5 is connected to a data processing unit 8. Also a key input unit 6, a map data memory unit 7 and a display unit 9 are connected to the above-described data processing unit 8.

An operation of this navigation apparatus will now be described. An operator for a moving object such as a vehicle depresses, for example, a starting key mounted on the key input unit 6 so as to initialize the above-described navigation apparatus for the moving object. Subsequently, a function key such as a selection key is depressed, so that either GPS type navigation function, or self-contained type navigation function is selected. Assuming now that the former navigation function is selected, both the drive distance sensor 1 and azimuth sensor 2 are electrically separated from the position detecting unit 5 by actuating a mechanical switch or the like (not shown), with the result that the present position and moving direction of the moving object are recognized or decided based upon only the electromagnetic waves received via the antenna 3 from the artificial satellites. When, on the other hand, the GPS navigation function cannot be selected due to existence of various interfering objects, the self-contained type navigation function is selected. Accordingly, the present position and moving direction of the moving object are confirmed and decided based upon only the data acquired from the drive distance sensor 1 and azimuth sensor, 2.

In such a conventional navigation apparatus, only the map illustrating the present position of the moving object is merely displayed on the display unit 9, and since the display scale is fixed on this display unit 9, the following drawback may be provided. That is, as the destination place to which the moving object is directed is located far from the present position, for instance, both positions cannot be observed at one time by utilizing a single display screen of the display unit 9. In such a case, an operation is required to properly change the map illustrating the present position of the moving object and the map illustrating the destination place to which the moving object is directed. Moreover, such a map changing operation is required in conjunction with the moving operation of the moving object. As a result, there is a risk that the safety driving operation of the moving object may not be expected.

In addition, since the display scale is fixed regardless the moving velocity of the moving object in the conventional navigation apparatus, the fine moving paths are simply displayed on the display unit 9 even if, for instance, the moving object is moving at the higher velocity. As a consequence, it is difficult that the operator of the moving object can surely observe the display screen under the high-speed movement. Furthermore, since such a map observation must be performed in conjunction with the driving operation of the moving object, the satisfactory drive operation of the moving object may not be achieved.

Also in the conventional navigation apparatus, since the display scale is fixed regardless of the variations in the steering angle occurring in the movement of the moving object, it is difficult for the operator of the moving object to observe the display screen on which the fine moving paths are merely displayed under the following conditions. That is, even when, for example, the moving object is required to be quickly turned at the crossing on the moving path during which the precise driving operation of the moving object must be required, the operator is required to observe such a fine moving path displayed on the display screen. As a consequence, the above-explained risks may be induced in such a conventional navigation apparatus

SUMMARY OF THE INVENTION

A major object of the present invention is to provide a navigation apparatus for a moving object, capable of continuously displaying a map with an optimum scale by varying a scale of a map displayed on a display unit in accordance with a moving condition of the moving object.

A further object of the present invention is to provide a navigation apparatus for a moving object where an optimum scale of a map displayed on a display unit can be set in accordance with a distance between the present position of the moving object and the destination place to which the moving object is directed, there is no need to properly change a map illustrating the present position and a map illustrating the destination place, and thus the displayed screen is extremely easy for observation by selecting the optimum scale in accordance with a display range of this map.

A still further object of the present invention is to provide a navigation apparatus for a moving object wherein an optimum scale of a map displayed on a display unit can be set in accordance with moving velocities of the object, and thus a map displayed on the display unit suitable for the moving velocities can be readily observed.

A yet still further object of the present invention is to provide a navigation apparatus for a moving object wherein an optimum scale of a map displayed on a display unit can be set in accordance with variations in a steering angle in accordance with the moving operation of the moving object, and thus the map displayed on the display unit, adapted to the variations in the steering angle of the moving object.

A navigation apparatus for a moving object according to the present invention, comprises a position detecting unit for detecting a present position of the moving object, by receiving a signal relating to a distance over which the moving object has traveled, an azimuth angle in a moving direction, and the like;

a map data memory unit for storing predetermined map data;

a key input unit for inputting predetermined data and instructions;

a data processing unit for obtaining predetermined output data by processing the above-described various signals, data, and the like; and, a display unit for displaying a map relating to a present position of the moving object and a destination place to which the moving object is directed, the above-described map being displayed with an optimum scale by changing the scale of the map displayed on the display unit in accordance with the moving conditions of the moving object.

According to a first preferred embodiment of the invention, both the present position of the moving object and also the destination place to which the moving object is directed are called for an attention as the moving conditions of the moving object in the navigation apparatus. Then, a scale key input unit is provided on the key input unit, if required. A scale judgement processing unit is employed in the data processing unit. In accordance with the distance between the present position of the moving object and the destination place to which the moving object is directed, the optimum scale of the map displayed on the display unit is set by manually, or automatically operating the scale key input unit.

In the navigation apparatus for the moving object according to the second preferred embodiment of the invention, the moving velocities of the moving object is called for an attention as the moving conditions of the moving object. As a result, the above-described map data memory unit is subdivided into a plurality of memory units, and both a velocity calculating unit and a memory unit selecting unit are provided with the data processing unit, whereby the optimum scale of the map displayed on the display unit can be set in accordance with the velocity of the moving object.

Further, in the navigation apparatus for the moving object according to the third preferred embodiment of the invention, the variations in the steering angle of the moving object are called for an attention as the moving conditions of the moving object. A steering angle sensor is connected to the position detecting unit for detecting the variations in the steering angle, the map data memory unit is subdivided into a plurality of memory units, and both a velocity calculating unit and a memory unit selecting unit are provided on the data processing unit, whereby the optimum scale of the map displayed on the display unit is set depending upon the variations in, the steering angle of the moving object.

BRIEF DESCRIPTION OF THE DRAWINGS

FIG. 3 is a flowchart for explaining operations of the navigation apparatus for the moving object according to the first preferred embodiment;

FIG. 6 is a schematic block diagram of a navigation apparatus for a moving object according to a second preferred embodiment of the invention;

FIG. 11 is a flowchart for explaining operations of the navigation apparatus according to the third preferred embodiment;

DETAILED DESCRIPTION OF THE PREFERRED EMBODIMENTS

Figure 1:
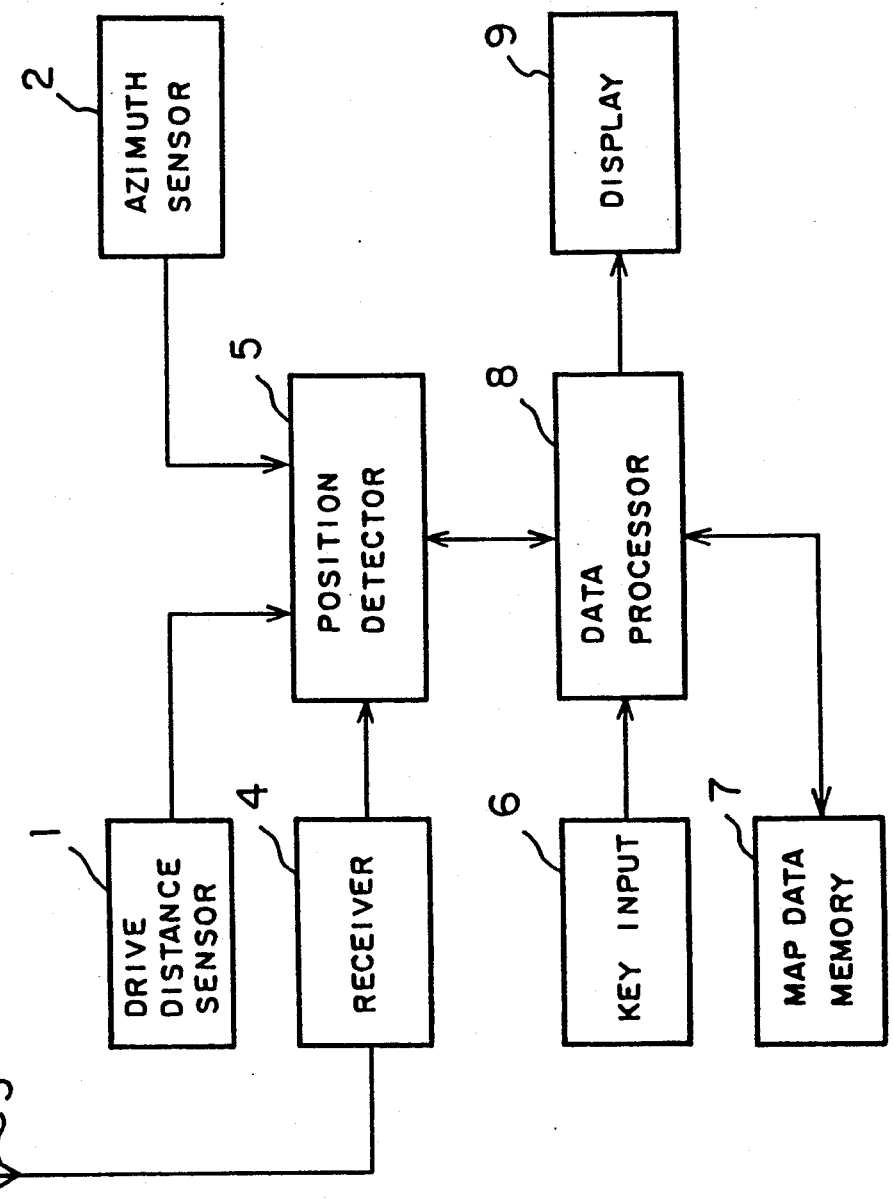
FIG. 1 is a schematic block diagram of the conventional navigation apparatus for the moving object.

Referring now to figures, a navigation apparatus for a moving object according to a first preferred embodiment of the invention will be described. It should be noted that no description is made to the common circuit portions of the navigation apparatus according to the first preferred embodiment, with those of the conventional navigation apparatus shown FIG. 1.

Figure 2:
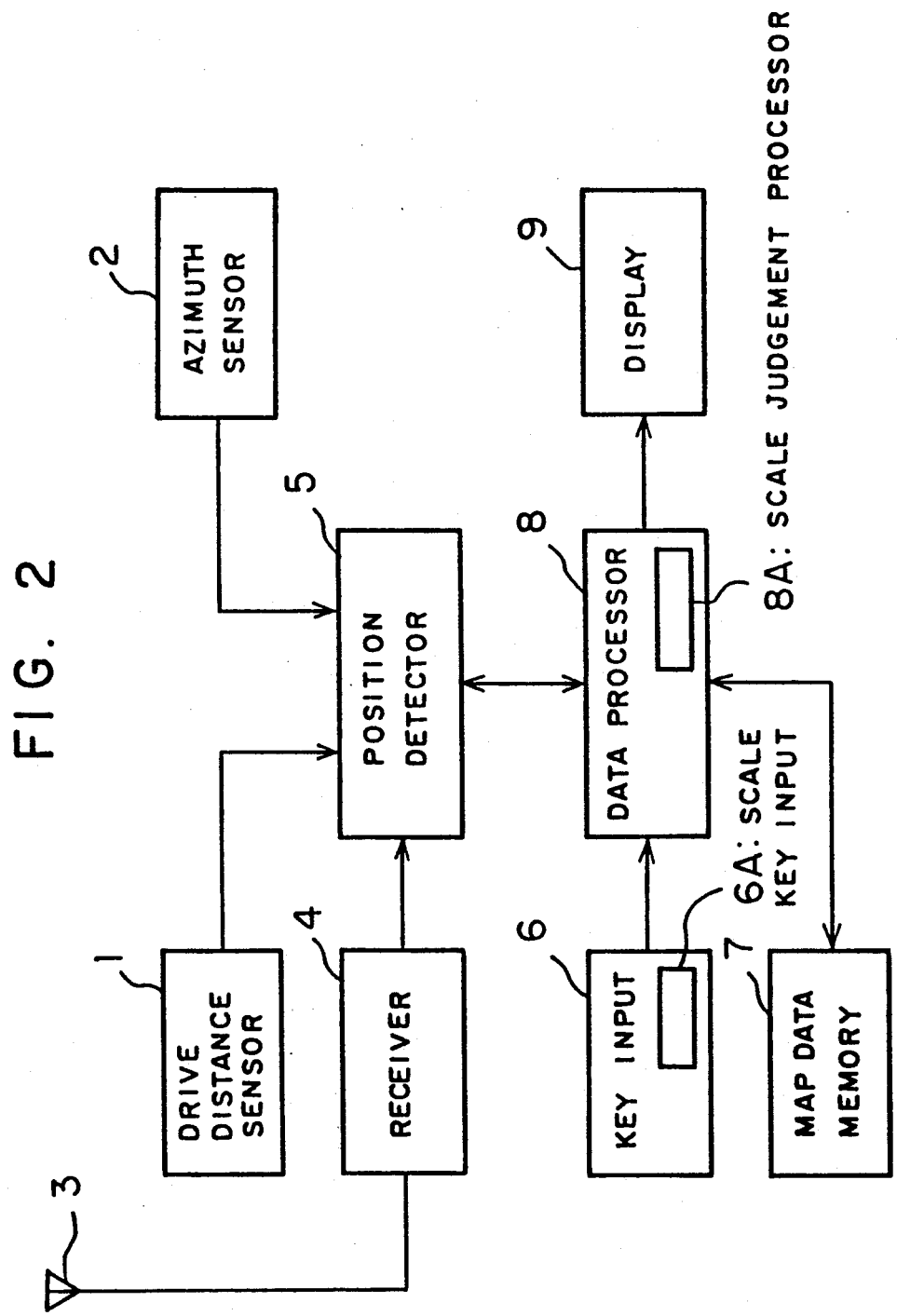
FIG. 2 is a schematic block diagram of a navigation apparatus for a moving object according to a first preferred embodiment of the invention.

In the navigation apparatus according to the first preferred embodiment shown in FIG. 2, an output side of the position detecting unit 5 is connected to a data processing unit, 8 including a scale judgement processing unit 8A. A key input unit 6 including a scale key input unit 6A, a map data memory unit 7 and a display unit 9 are connected to the above-described data processing unit 8.

Figure 5A:
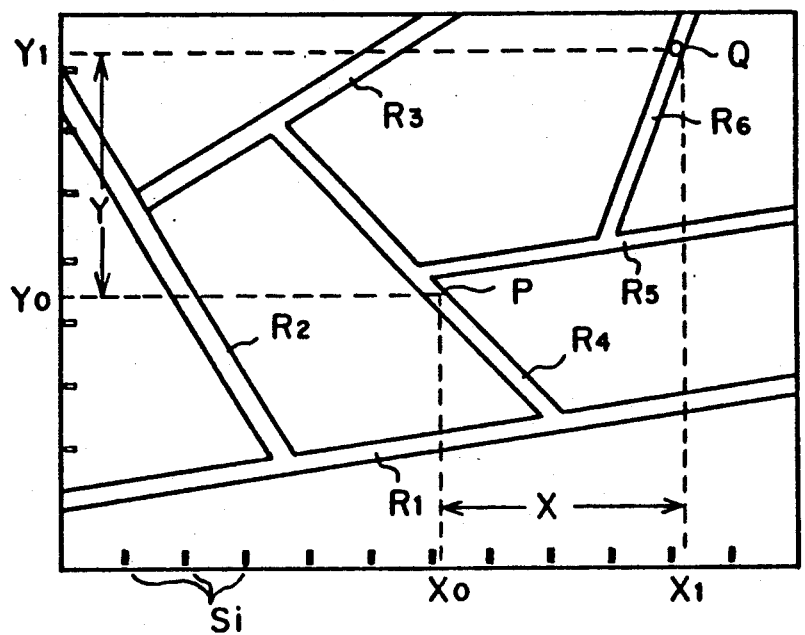
FIGS. 5a and 5b schematically illustrate a display screen of a display unit.
Figure 5B:
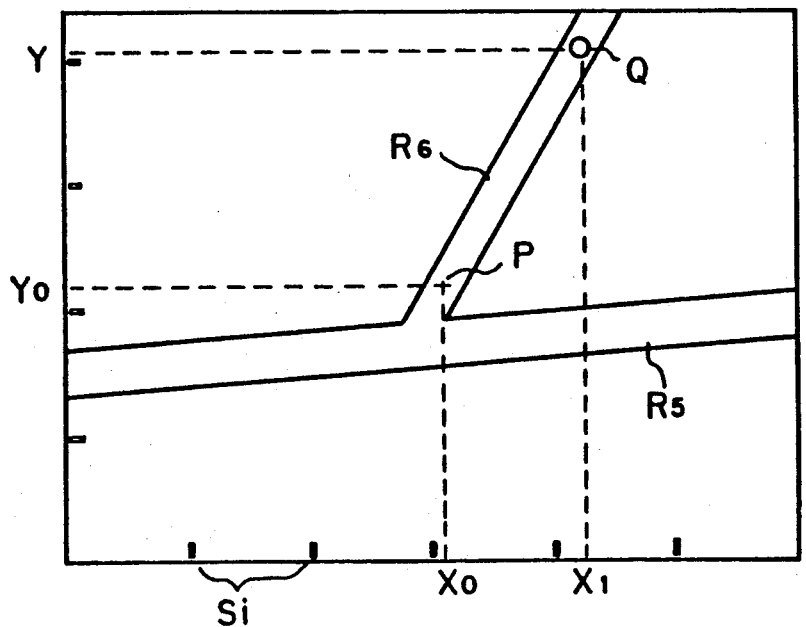

FIG. 5a is an illustration where there is a long distance between a present position "P" of the moving object and a destination place "Q" to which the moving object is directed. To the contrary, FIG. 5b is an illustration for representing such a condition that the moving object advances toward the destination place "Q" to which the moving object is directed, and therefore there is a short distance between the present position "P" and destination position "Q". It should be noted in FIG. 5 that symbols "R₁" to "R₆" indicate a moving path over which the moving object is traveled; symbols Xo, Yo denote coordinate values of the present position "P" of the moving object; and symbols $X_1$, $Y_1$ represent coordinate values of the designation position "Q" of the moving object. A distance between the present position and destination position is represented by the following equations:

$$X = X_1 - X_0 \quad (1)$$

$$Y = Y_1 - Y_0 \quad (2)$$

In addition, a symbol "S₁" indicates a mark representative of a scale of a displayed map.

Operations of the navigation apparatus according to the first preferred embodiment shown in FIG. 2 will now be described with reference to FIGS. 3, 5. An operator of a moving object such as a vehicle, or the like depresses, for instance, a starting key mounted on the key input unit 6 in order to initialize this navigation apparatus (step S20). Subsequently, a coordinate value Xhd 1, $Y_1$ relating to a destination place to which the moving object is directed, is set by the key input unit 6 (step S21). Then, a self-contained type signal such as a GPS signal as the electromagnetic waves transmitted from a plurality of satellites, which can be received by the moving object itself, is taken via the antenna 3, drive distance sensor 1 and azimuth angle sensor 2, and thereafter, another coordinate value X₀, Y₀ concerning a present position "P" of the moving object is calculated (step S22). In the next step, the distance data between the present position "P" of the moving object and destination place "Q" to which the moving object is directed is calculated based upon the above-described equations (1) and (2).

Based upon the thus calculated distance data, the proper scale judgement/selection with respect to the corresponding map are performed by the operation of the scale judgement processor 8A.

Figure 4A:
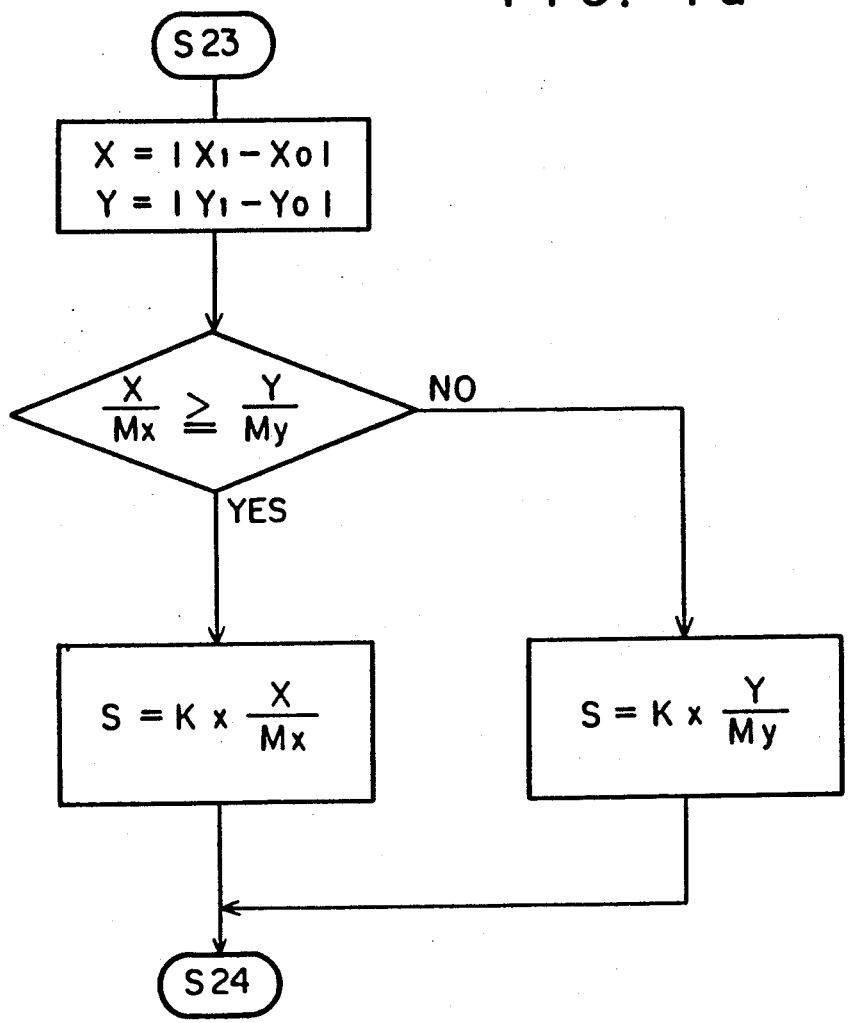
FIG. 4a is a flowchart defined from the step 23 (S23) to the step 24 (S24) in FIG. 3.

Now a description will be made to the scale judgement process (see FIG. 4a).

First, a difference in a distance between the destination place "Q" and the present position "P" along the X direction and Y direction is calculated. Then, a comparison is made to check a ratio of a length (Mx) in the X direction to a length (My) in the Y direction, which are inherent to the map data. As a result, if a value of X/Mx is greater than, or equal to another value of Y/My, a scale "S" displayed on CRT is given by:

$$S = K \times X/Mx.$$

To the contrary, if the value of X/Mx is smaller than, or equal to the value of Y/My, this scale "S" displayed on CRT is given by:

$$S = K \times Y/My,$$

where "K" is a correction coefficient (e.g., 1,2) that is used to display a peripheral area of both the destination place "Q" and present position "P" of the CRT screen.

It should be noted that with respect to the calculated scale "S", the length (Dx) in the X direction and the length (Dy) in the Y direction of the map displayed on CRT are expressed by:

$$Dx = S \times Mx,$$

and $$Dy = S \times My.$$

Figure 4B:
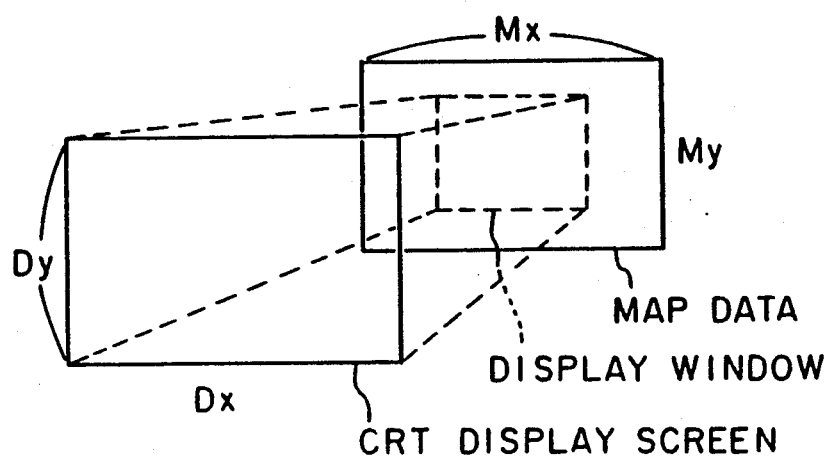
FIG. 4b is an explanatory diagram showing the relationship between map data and scale of the map displayed on a display screen.

(see FIG. 4b)

It should be understood that the above-described scale judgement process is merely one example of the scale judgement processing methods.

A detailed flowchart is defined from the step 23 (S23) of FIG. 3 to the step 24 (S24).

The results of this judgement/selection are displayed as an instruction on, for instance, the proper position on the display unit 9. The scale setting based on this instruction is performed from the scale key input unit 6A (step S24). Subsequently, the display of the corresponding map is executed under the above-described set scale (step S25).

Assuming now that the present position "P" of the moving object is present on the moving path "R₄", there is a considerably long distance between the present position "P" and the destination place "Q" to which the moving object is directed. Under this condition, as illustrated in FIG. 4A, the corresponding map is displayed in the relatively small scale.

Thereafter, the control process returns to the step S22 with a predetermined time interval, and the present position "P" of the moving object is calculated/ corrected. Then, when the moving object is continuously moved, and the present position "P" of the moving object is shifted to the moving path "R₆", a distance between the present position "P" and the destination place "Q" becomes small, and as illustrated in FIG. 5b, the map is displayed under the corresponding scale.

A modified navigation apparatus according to the first preferred embodiment will now be described. That is, when the scale judged/selected by the scale judgement processing unit 8A is displayed on the display unit 9, the display of the map corresponding to the above-described scale may be automatically executed without setting the scale key input unit 6A. As a result, in this modified navigation apparatus, there is no need to employ the key input unit 6 on the scale key input unit 6A, and the key operation thereof is no longer required. Then, the desired map can be quickly, automatically, and more easily displayed on the display unit 9 with the proper scale.

As previously described above, the navigation apparatus for the moving object according to the first preferred embodiment is constructed by comprising: a position detecting unit for detecting a present position of the moving object by receiving a signal relating to a distance over which the moving object has traveled, an azimuth angle in a moving direction, and the like;

a map data memory unit for storing predetermined map data;

a key input unit for inputting predetermined data and instructions;

a data processing unit for obtaining predetermined output data by processing the above-described various signals, data,, and the like; and, a display unit for displaying a map relating to a present position of the moving object and a destination place to which the moving object is directed. Then, the scale key input unit may be provided on the key input unit, if required, whereas the scale judgement processing unit is employed in the data processing unit. As a result, since the optimum scale for the map displayed on the display unit can be manually, or automatically set by use of the scale key input unit in accordance with the distance between the present position of the moving object and the destination place to which the moving object is directed, no operation is required to change the map illustrating the present position of the moving object and the map illustrating the destination place. And also, due to the optimum scale in accordance with the display range of the map, the displayed screen can be very easily observed by the operator.

Then, referring to FIGS. 6 to 9, a navigation apparatus according to a second preferred embodiment of the invention will be described.

In FIG. 6, the output side of the position detecting unit 5 is connected to the data processing unit 8 including both a velocity calculating unit 8B and a memory unit selecting unit 8C. The key input unit 6, a map data memory unit 7 subdivided into first and second memory units 7A, 7B and the display unit 9 are connected to the data processing unit 8.

Figure 9A:
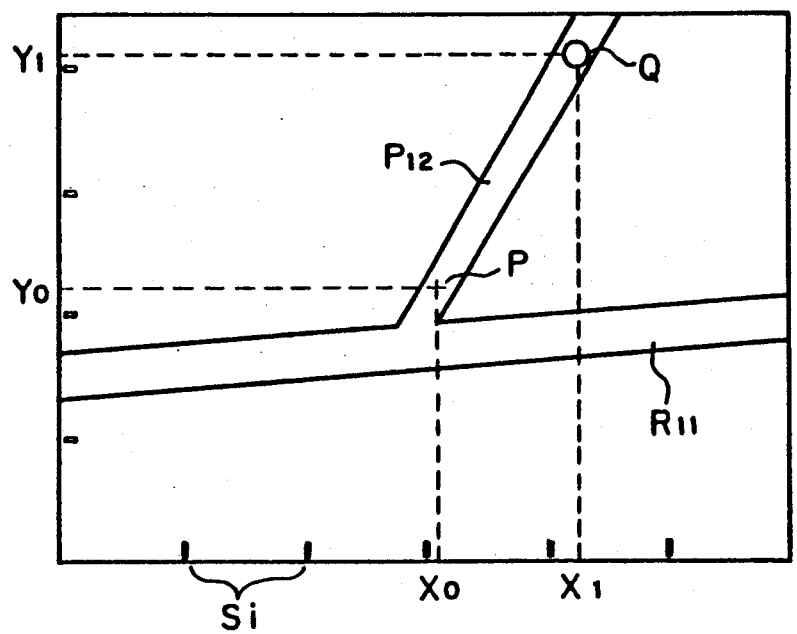
FIGS. 9a and 9b schematically illustrate a display screen of a display unit in the navigation apparatus according to the second preferred embodiment.
Figure 9B:
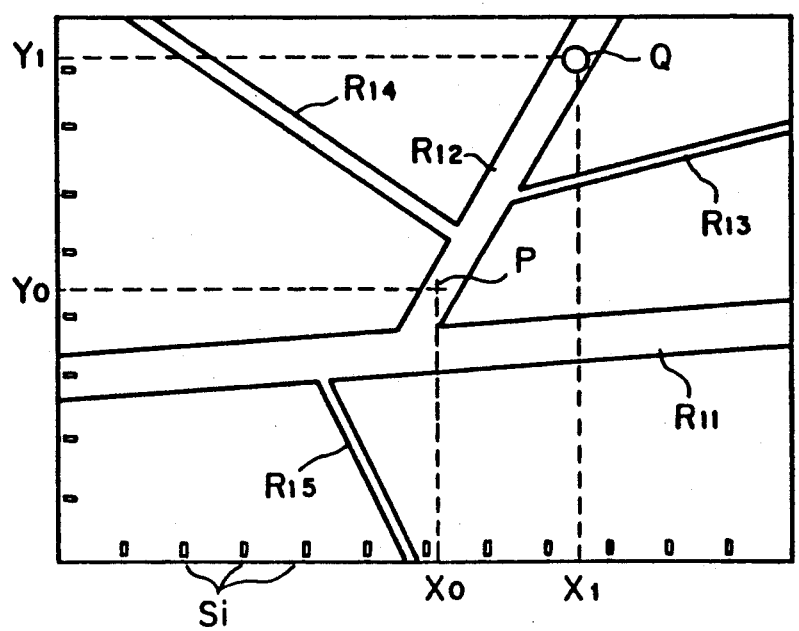

FIG. 9a is an illustration for showing the case that the moving velocity of the moving object exceeds over a predetermined value. To the contrary, FIG. 9b is an illustration for representing the case that the moving velocity of the moving object is lowered than a predetermined value. It should be noted that in FIG. 9, symbols "$R_{11}$" to "$R_{15}$" represent the moving paths for the moving object. In the moving paths, symbols "$R_{11}$" and "$R_{12}$" represent a main-route road such as an automobile-exclusive road, a state road, and a city road, and symbols "$R_{13}$" to "$R_{15}$" indicate an auxiliary-route road such as a town road.

The operation of the navigation apparatus according to the second preferred embodiment will now be described with reference to FIGS. 7 and 9, additionally.

Figure 7:
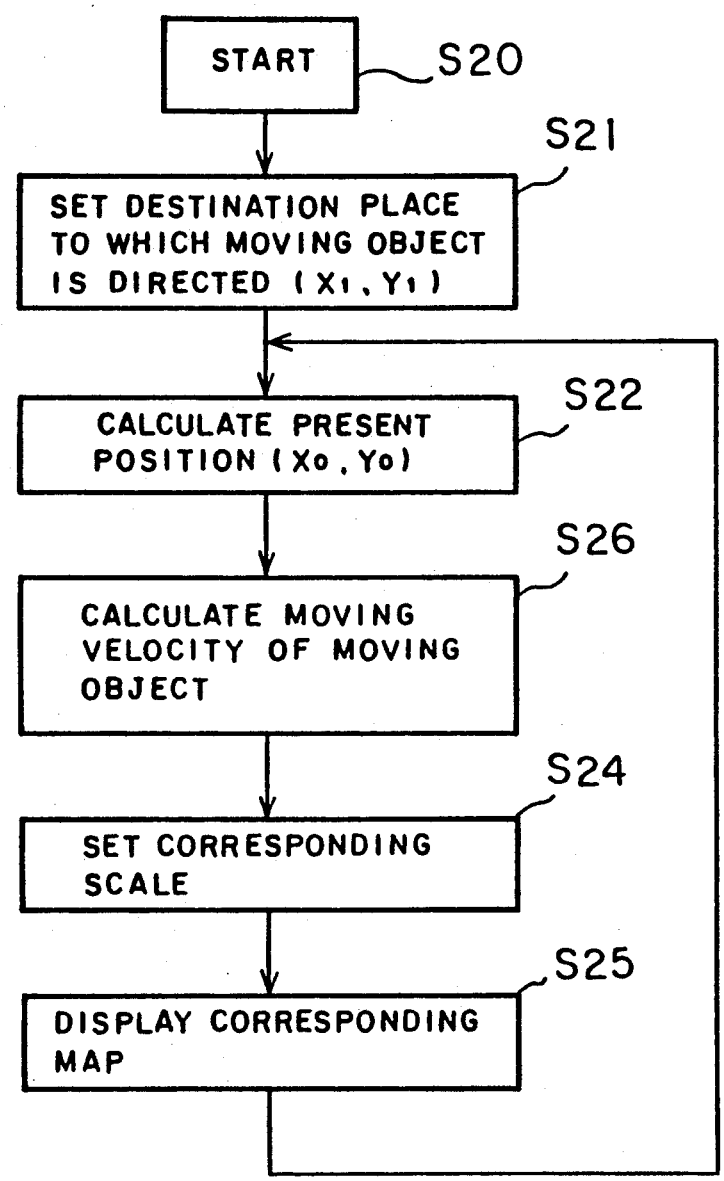
FIG. 7 is a flowchart for describing operations of the navigation apparatus according to the second preferred embodiment.

In a flowchart shown in FIG. 7, the processes defined by all steps other than a new step S26 are executed similar to those of the first preferred embodiment.

That is, in the step S22, the coordinate value ($X_0$, $Y_0$) of the present position "P" of the moving object is calculated. In the subsequent step S26, the moving velocity of the moving object is calculated at a predetermined time interval. It should be noted that this velocity calculation is carried out in the velocity calculating unit 8B in the data processing unit 8, and, for instance, the desired velocity is obtained by calculating the travel distance per one hour for the moving object. Then, the proper scale corresponding to the moving velocity calculated in the above step S26 is set by the manual operation, or automatic operation which is similar to that of the first preferred embodiment (step S24). Thereafter, the corresponding map is displayed (step S25).

As previously described, the map data memory unit 7 shown in FIG. 6, is divided into the first and second memory units 7A, 7B. In this first memory unit 7A, the map data corresponding to the large scale such as the main-route roads $R_{11}$, $R_{12}$ is stored, whereas in the second memory unit 7B, the map data corresponding to the small scale such as the auxiliary-route roads $R_{13}$ to $R_{15}$ is stored.

The average moving velocity is calculated based upon the changes in the present position of the vehicle while the vehicle is moved. As shown in FIG. 9a, when the average moving velocity exceeds over, for instance, 50 km/h, the large scale is set, the first memory unit 7A in the map data memory unit 7 is accessed by the memory selecting unit 8C within the data processing unit 8, and accordingly, only the main-route roads such as $R_{11}$ and $R_{12}$ are displayed. To the contrary, when the average moving velocity of the moving object is lower than, or equal to 50 km/h, as illustrated in FIG. 9b, the small scale is set, and both the first and second memory units 7A and 7B within the above-described map data memory unit 7 are selected by the memory selecting unit 8C, so that the auxiliary-route roads such as $R_{13}$ to $R_{15}$ are displayed in combination with the main-route roads.

Figure 8A:
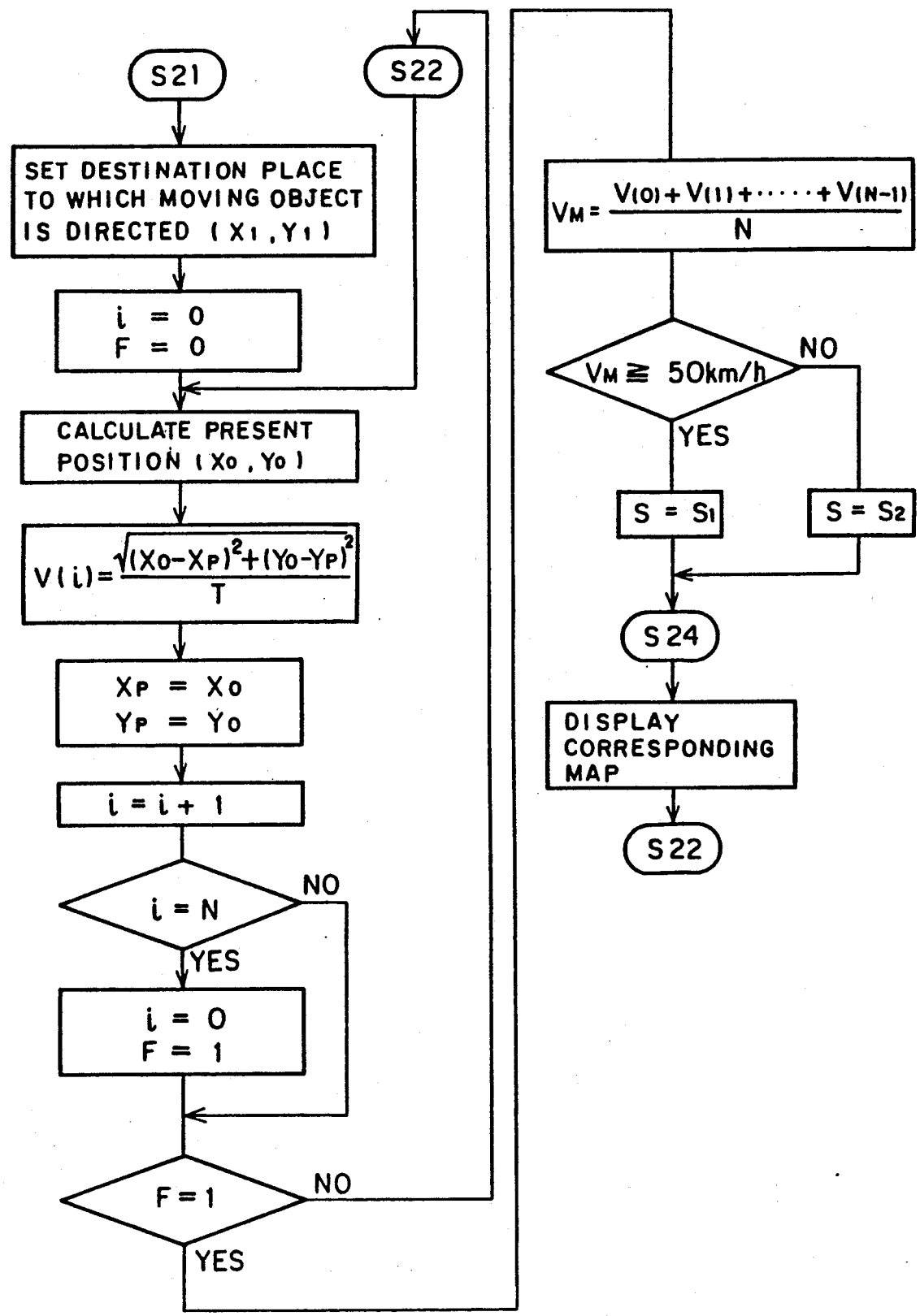
FIG. 8a is a flowchart defined from the step 21 (S21) to the step 24 (S24) in FIG. 7.
Figure 8B:
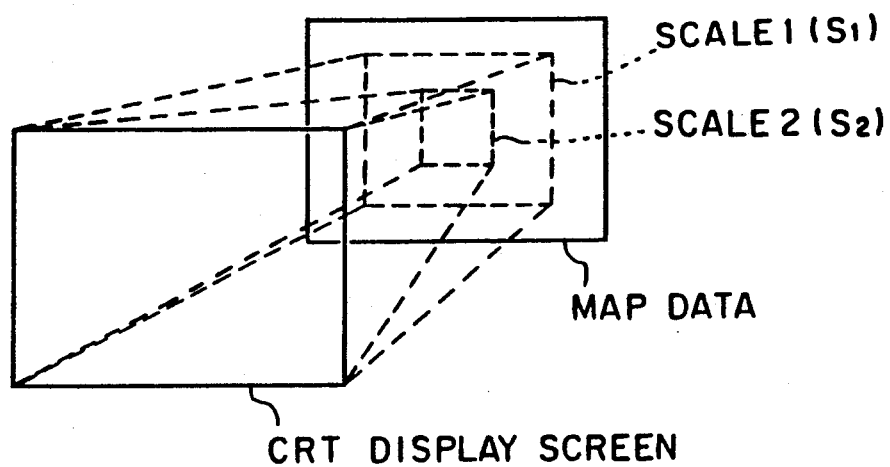
FIG. 8b is an explanatory diagram showing the relationship between map data and scale of the map displayed on a display screen.
Figure 12B:
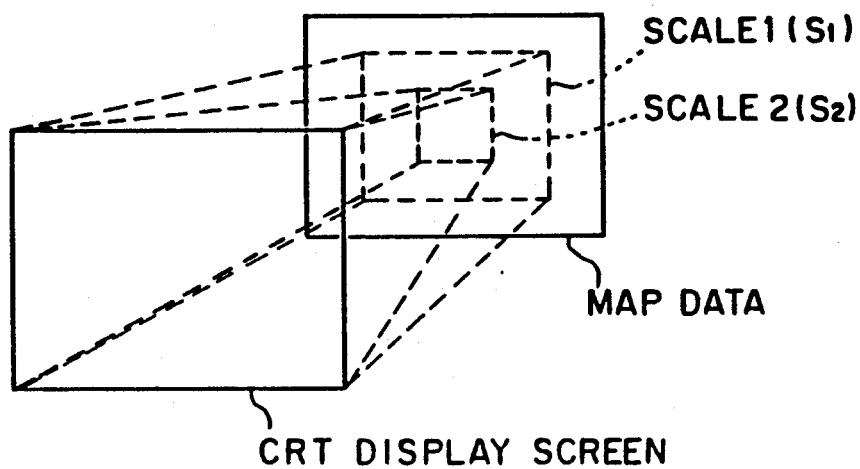
FIG. 12b is an explanatory diagram showing the relationship between map data and scale of the map displayed at a display screen.

The judgement process of the display scale based on the moving velocities of the moving object is illustrated in FIG. 8a. FIG. 8a illustrates the relationship between the scale of the map displayed on CRT and the map data.

As a result, the map adapted to the corresponding scale is displayed on the display screen, and an operator operates the moving object while observing this displayed map. The control process is returned to the step S22 in a predetermined time interval, and the moving velocity of the moving object is calculated while confirming the present position. Thus, both the optimum scale corresponding to the velocity calculation results and display of the corresponding map are properly performed in the navigation apparatus shown in FIG. 6.

In the navigation apparatus for the moving object according to the second preferred embodiment of the invention, the above-described map data memory unit is subdivided into a plurality of memory units, and both a velocity calculating unit and a memory unit selecting unit are provided with the data processing unit, whereby the optimum scale of the map displayed on the display unit can be set in accordance with the velocity of the moving object by the manual operation, or automatic operation. As a consequence, because of the optimum scale corresponding to the display range of the map, the display screen can be very easily observed and confirmed while driving the moving object.

Figure 10:
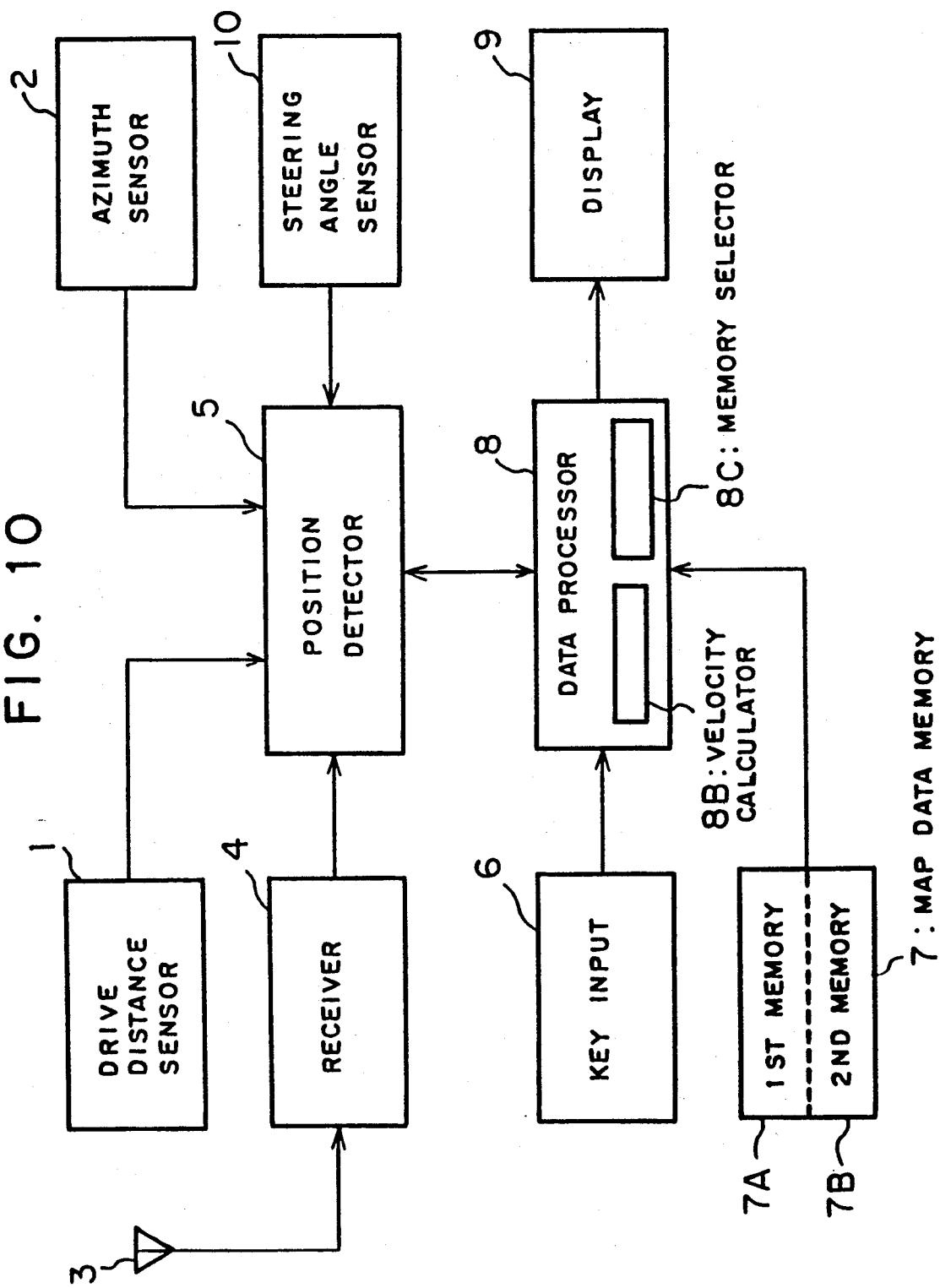
FIG. 10 is a schematic block diagram of a navigation apparatus for a moving object according to a third preferred embodiment of the invention.

Referring now to FIGS. 10 and 11, a navigation apparatus according to a third preferred embodiment of the invention will be described.

In FIG. 10, to the position detecting unit 5, a steering angle sensor 10 is connected so as to detect variations in the steering angle in accordance with the movement of the moving object. The output side of the position detecting unit 5 is connected to the data processing unit 8 including the velocity calculating unit 8B and memory selecting unit 8C. The key input unit 6, the map data memory unit 7 subdivided into the first and second memory units 7A, 7B, and display unit 9 are connected to the data processing unit 8.

The operations of the navigation apparatus according to the third preferred embodiment will now be described with reference to flowchart shown in FIG. 11. In this operation, the processes defined by all steps other than a new step S27 are executed similar to those in the above-described first and second preferred embodiments.

That is, in the step S22, the coordinate value ($X_0$, $Y_0$) of the present position "P" of the moving object is calculated. In the next step S27, the sensor signal derived from the steering angle sensor 10 is received and then the variations in the steering angles according to the movement of the moving object are detected. Thereafter, the scale corresponding to the variations in the steering angles which have been detected is set by the manual operation or automatic operation, which is similar to that in the first and second preferred embodiments (step S24). Then, as illustrated in FIG. 9, the corresponding map is displayed on the display screen (step S25).

As previously described, the map data memory unit 7 shown in FIG. 10 is subdivided into the first and second memory units 7A and 7B. The first memory unit 7A contains the map data corresponding to the large scale required to display the road such as the main-route roads "$R_{11}$" and "$R_{12}$". The second memory unit 7B contains the map data corresponding to the small scale required to display the road such as the auxiliary roads "$R_{13}$" to "$R_{15}$".

As illustrated in FIG. 9a, when the degree of the average steering angle which has been calculated from the changes in the steering angle produced by the movement of the moving object is smaller than, or equal to 5 degrees, the first memory unit 7A within the map data memory unit 7 is accessed by the memory selecting unit 8C in the data processing unit 8. As a consequence, only the main-route roads such as $R_{11}$ and $R_{12}$ are displayed. To the contrary, when the degree of the average steering angle of the moving object which has been calculated from the changes in the steering angle produced by the movement of the moving object exceeds over 5 degrees, the small scale is set. As a result, both the first and second memory units 7A and 7B in the above-described map data memory unit 7 are selected and thus the auxiliary-route roads such as $R_{13}$ to $R_{15}$ are displayed in addition to the main-route roads.

Figure 12A:
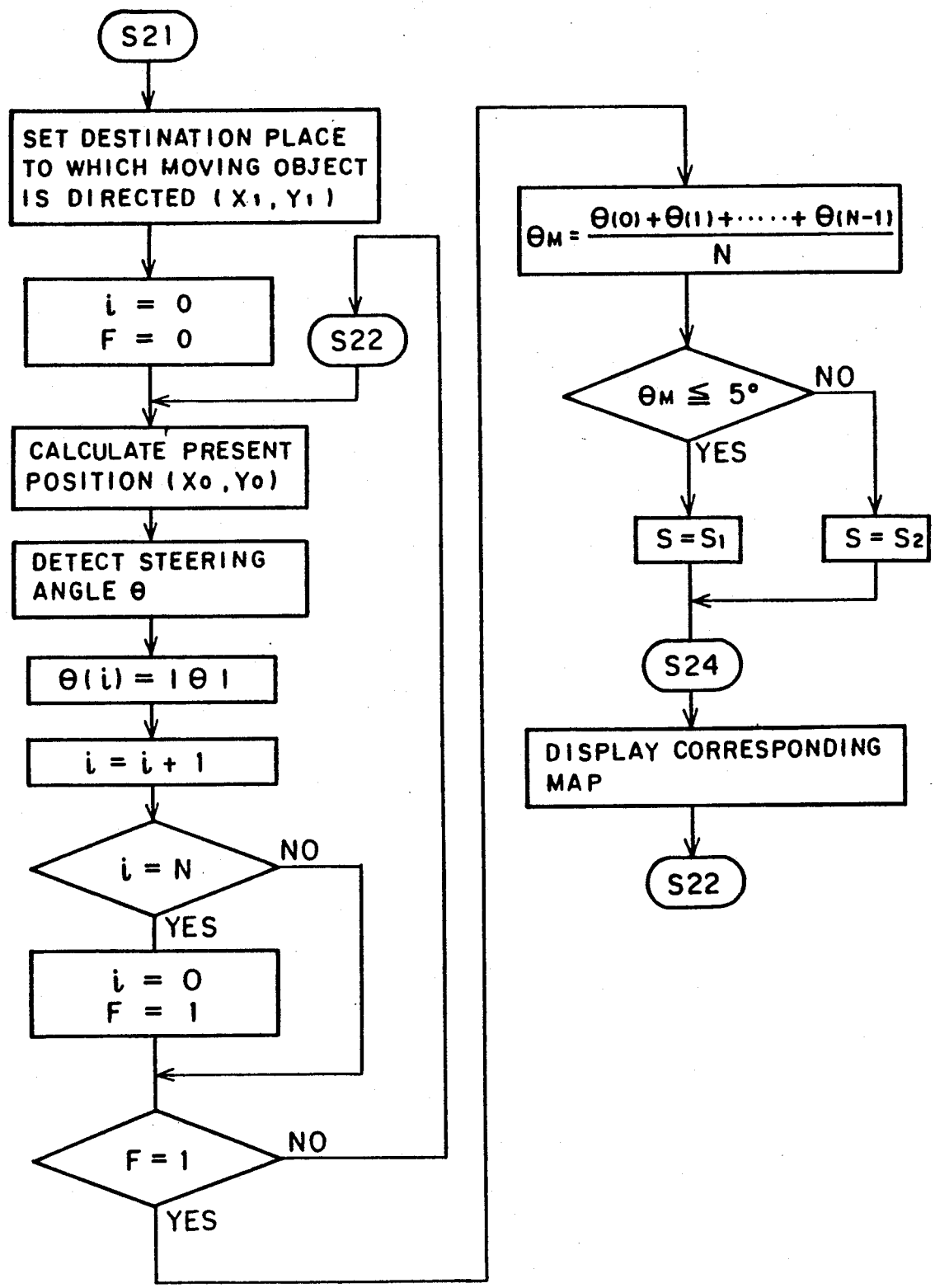
FIG. 12a is a flowchart defined from the step 21 (S21) to the step 24 (S24) in FIG. 11.

The judgement process of the display scale based upon the changes in the steering angle of the moving object is shown in FIG. 12a. FIG. 12a illustrates the relationship between the scale of the map displayed on CRT and the map data.

Accordingly, the map adapted to the corresponding scale is displayed and the moving object is driven while this map is observed. The control process is returned to the step S22 at a predetermined time interval, and the degrees of the steering angles changed in accordance with the movement of the moving object are detected while the present position of the moving object is confirmed. As a result, both the scale setting based upon the detecting results of the steering angle variations, and, the display of the map corresponding to this set scale are properly performed in the navigation apparatus shown in FIG. 10.

While has been described above, the navigation apparatus for the moving object according to the third preferred embodiment is arranged such that a steering angle sensor is connected to the position detecting unit for detecting the variations in the steering angle, the map data memory unit is subdivided into a plurality of memory units, and both a velocity calculating unit and a memory unit selecting unit are provided on the data processing unit, whereby the optimum scale of the map displayed on the display unit is set depending upon the variations in the steering angle of the moving object. As a consequence, in response to the variations in the steering angles according to the movement of the moving object, the optimum scale of the map displayed on the display unit can be set by the manual operation, or automatic operation. Even when the fine driving operation of the moving object is required for such a case that, for instance, the moving object must be quickly turned at the crossing on the moving path, the moving path suitable for such a condition is displayed on the display screen due to the setting of the optimum scale corresponding to the display range of the map. Then, the operator of the moving object can easily, surely observe the display screen. Moreover, the fine driving operation of the moving object can be readily achieved while observing the display screen under the above-described drive conditions.

What is claimed is:

1. A navigation apparatus for a moving object, comprising:
  a position detecting unit for detecting a present position of said moving object by receiving a signal relating to a distance over which said moving object has traveled and to an azimuth angle of a moving direction;
  a map data memory unit, including a plurality of memory units, for storing predetermined map data;
  a key input unit for inputting predetermined input data;
  a data processing unit, responsive to said position detecting unit, said map memory data unit, and said key input unit, for obtaining predetermined output data indicative of a velocity of said moving object by processing said received signal, map data, and input data, said data processing unit including a memory selecting unit for selecting at least one of said plurality of memory units at least partially on the basis of said velocity; and
  a display unit, responsive to said data processing unit, for displaying a map relating to a present position of the moving object and a destination to which the moving object is directed, said map being displayed with an optimum scale by changing the scale of the map displayed on the display unit in accordance with said velocity as indicated by said output data.

2. A navigation apparatus for a moving object, comprising:
  a position detecting unit for detecting a present position of said moving object by receiving a signal relating to a distance over which said moving object has traveled and to an azimuth angle of a moving direction;

a steering angle sensor connected to said position detecting unit for detecting variations in steering angle;

a map data memory unit, including a plurality of memory units, for storing predetermined map data;

a key input unit for inputting predetermined input data;

a data processing unit, responsive to said position detecting unit, said map memory data unit, and said key input unit, for obtaining predetermined output data indicative of a moving condition including a velocity and steering angle of said moving object by processing said received signal, map data, and input data, said data processing unit including a memory selecting unit for selecting at least one of said plurality of memory units at least partially on the basis of said steering angle; and a display unit, responsive to said data processing unit, for displaying a map relating to a present position of the moving object and a destination to which the moving object is directed, said map being displayed with an optimum scale by changing the scale of the map displayed on the display unit in accordance with said steering angle as indicated by said output data.

* * * * *